US011019078B2

(12) United States Patent
Jain et al.

(10) Patent No.: US 11,019,078 B2
(45) Date of Patent: May 25, 2021

(54) ENHANCED NETWORK THROUGHPUT USING NETWORK INTRUSION DETECTION AND PREVENTION SERVICE (NIDPS) DETECTION

(71) Applicant: International Business Machines Corporation, Armonk, NY (US)

(72) Inventors: Vinit Jain, Austin, TX (US); Sudheesh S. Kairali, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 16/156,189

(22) Filed: Oct. 10, 2018

(65) Prior Publication Data

US 2020/0120108 A1 Apr. 16, 2020

(51) Int. Cl.
  *H04L 29/06* (2006.01)
  *H04L 29/08* (2006.01)

(52) U.S. Cl.
  CPC ...... *H04L 63/1416* (2013.01); *H04L 63/0281* (2013.01); *H04L 67/28* (2013.01)

(58) Field of Classification Search
  CPC ..... H04L 67/10; H04L 67/28; H04L 63/0281; H04L 63/1416
  See application file for complete search history.

(56) References Cited

U.S. PATENT DOCUMENTS

| 9,112,901 | B2 | 8/2015 | Blander et al. |
| 9,397,881 | B1 | 7/2016 | Fritz |
| 10,050,999 | B1* | 8/2018 | Rossman ............ H04L 63/1433 |
| 10,158,653 | B1* | 12/2018 | Magcale ............ H04L 63/1441 |
| 2010/0103851 | A1* | 4/2010 | Chintada ............... H04W 88/04 370/312 |
| 2011/0023152 | A1* | 1/2011 | Weinstein .......... C12N 15/8509 800/3 |
| 2015/0150113 | A1* | 5/2015 | Robb .................. H04L 63/0281 726/12 |

(Continued)

OTHER PUBLICATIONS

Elike Hodo et al., "Machine Learning Approach for Detection of non T or Traffic", ARES' 17, Aug. 2017, 6 pages.

*Primary Examiner* — Mohammad A Siddiqi
(74) *Attorney, Agent, or Firm* — Scott S. Dobson; Hunter E. Webb; Keohane & D'Alessandro, PLLC

(57) ABSTRACT

Aspects of the present invention provide an approach for performing network intrusion detection and prevention service (NIDPS) detection on a proxy server in a networked computing environment. In an embodiment, the proxy server has a front end proxy, a NIDPS component, and a back end proxy installed on it. The front end proxy decodes communications sent by external users to content servers over a network that are intercepted by the proxy server and forwards the communications to the NIDPS component. The NIDPS component performs NIDPS detection to detect whether communications comprise a network threat. Communications that have been verified as not comprising a network threat are forwarded to the back end proxy for routing to their destinations. Communications that have been verified as threats are forwarded to a cognitive engine, which initiates an automatic scaling of the NIDPS component in response to indications of network threats from the NIDPS component.

17 Claims, 8 Drawing Sheets

(56) References Cited

U.S. PATENT DOCUMENTS

| | | |
|---|---|---|
| 2017/0034207 A1 | 2/2017 | Low et al. |
| 2017/0078314 A1* | 3/2017 | Mohanty ............... H04L 63/145 |
| 2017/0099310 A1 | 4/2017 | Di Pietro et al. |
| 2018/0082207 A1* | 3/2018 | Cormier .................. G06N 5/02 |
| 2019/0163379 A1* | 5/2019 | Bottan .................. G06F 3/0619 |
| 2019/0197239 A1* | 6/2019 | Govardhan ........... G06F 21/554 |
| 2019/0286819 A1* | 9/2019 | Maisel .................. G06F 21/563 |
| 2020/0099703 A1* | 3/2020 | Singh ................. H04L 63/1416 |

\* cited by examiner

ENHANCED NETWORK THROUGHPUT USING NETWORK INTRUSION DETECTION AND PREVENTION SERVICE (NIDPS) DETECTION

TECHNICAL FIELD

The subject matter of this invention relates generally to network communications. More specifically, aspects of the present invention provide a solution for performing network intrusion detection and prevention service (NIDPS) detection on a proxy server in a network computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Providers in the networked computing environment often deliver services online via a remote server, which can be accessed via a web service and/or software, such as a web browser. Individual clients can run virtual machines (VMs) that utilize these services and store the data in the networked computing environment. This can allow a single physical server to host and/or run many VMs utilizing many services simultaneously. These services can be provided as monolithic services, which include numerous functional elements within a single process, or as a microservice, in which each functional element is put into a separate service.

In any case, one of the biggest challenges administrators have to consider while migrating from conventional data centers to a cloud computing paradigm is security. One solution for providing security measures is to have a dedicated proxy/reverse proxy server in the cloud that acts as an intermediary service between an endpoint cloud service and a user or client that is requesting a service. This proxy service can exist in the same machine as a firewall server or it may be on a separate server, which forwards requests through the firewall. The proxy service can also allow an administrator to adjust the proxy cache to improve user response time or to access logs of its interactions to troubleshoot any problems, among other things.

One of the most important functions of a proxy service in the cloud paradigm is to prevent network intrusions before these intrusions ever reach an actual cloud-hosted service. Network Intrusion Detection and Prevention mechanisms (NIDPS) such as snort can detect and prevent an attack based on a packet level analysis of network traffic.

SUMMARY

In general, aspects of the present invention provide an approach for performing network intrusion detection and prevention service (NIDPS) detection on a proxy server in a networked computing environment. In an embodiment, the proxy server has a front end proxy, a NIDPS component, and a back end proxy installed on it. The front end proxy decodes communications sent by external users to content servers over a network that are intercepted by the proxy server and forwards the communications to the NIDPS component. The NIDPS component performs NIDPS detection to detect whether communications comprise a network threat. Communications that have been verified as not comprising a network threat are forwarded to the back end proxy for routing to their destinations. Communications that have been verified as threats are forwarded to a cognitive engine, which initiates an automatic scaling of the NIDPS component in response to indications of network threats from the NIDPS component.

One aspect of the invention provides a method for performing network intrusion detection and prevention service (NIDPS) detection on a proxy server in a networked computing environment, comprising: obtaining, by a NIDPS component located on a proxy server, a set of decoded communications from a front end proxy located on the proxy server, the decoded communications being communications sent by external users to content servers over a network that are intercepted by the proxy server and decoded by the front end proxy; performing, by a NIDPS component, a verification of the decoded communications to detect whether the communication comprises a network threat; forwarding, by the NIDPS component in response to the verification that the decoded communication does not comprise a network threat, a verified communication to a back end proxy; forwarding, in response to a detection of a network threat by the NIDPS component, an indication of the network threat to a cognitive server; and initiating an automatic scaling of the NIDPS component by the cognitive server in response to indications of network threats from the NIDPS component.

Another aspect of the invention provides a computer system for performing network intrusion detection and prevention service (NIDPS) detection on a proxy server in a networked computing environment, the computer system comprising: a proxy server located between a content server and a network and having a front end proxy that decodes a set of communications from external users over the network into decoded communications; a back end proxy operating independently from the front end proxy that generates routing information between the content servers and the external users for verified communications; a NIDPS component operating independently from the front end proxy and the back end proxy that verifies that the decoded communications are free from network threats and forwards the verified communications to the back end proxy; and a cognitive server that initiates automatic scaling of the NIDPS component in response to indications of network threats from the NIDPS component.

Yet another aspect of the invention provides a computer program product embodied in a computer readable medium that, when executed by a computer device, performs a method for performing network intrusion detection and prevention service (NIDPS) detection on a proxy server in a networked computing environment, the method comprising: obtaining, by a NIDPS component located on a proxy server, a set of decoded communications from a front end proxy located on the proxy server, the decoded communications being communications sent by external users to content servers over a network that are intercepted by the proxy server and decoded by the front end proxy; performing, by a NIDPS component, a verification of the decoded communications to detect whether the communication comprises a network threat; forwarding, by the NIDPS component in response to the verification that the decoded communication does not comprise a network threat, a verified communication to a back end proxy; forwarding, in response to a detection of a network threat by the NIDPS component, an indication of the network threat to a cognitive server; and initiating an automatic scaling of the NIDPS component by the cognitive server in response to indications of network threats from the NIDPS component.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings.

Figure 1:
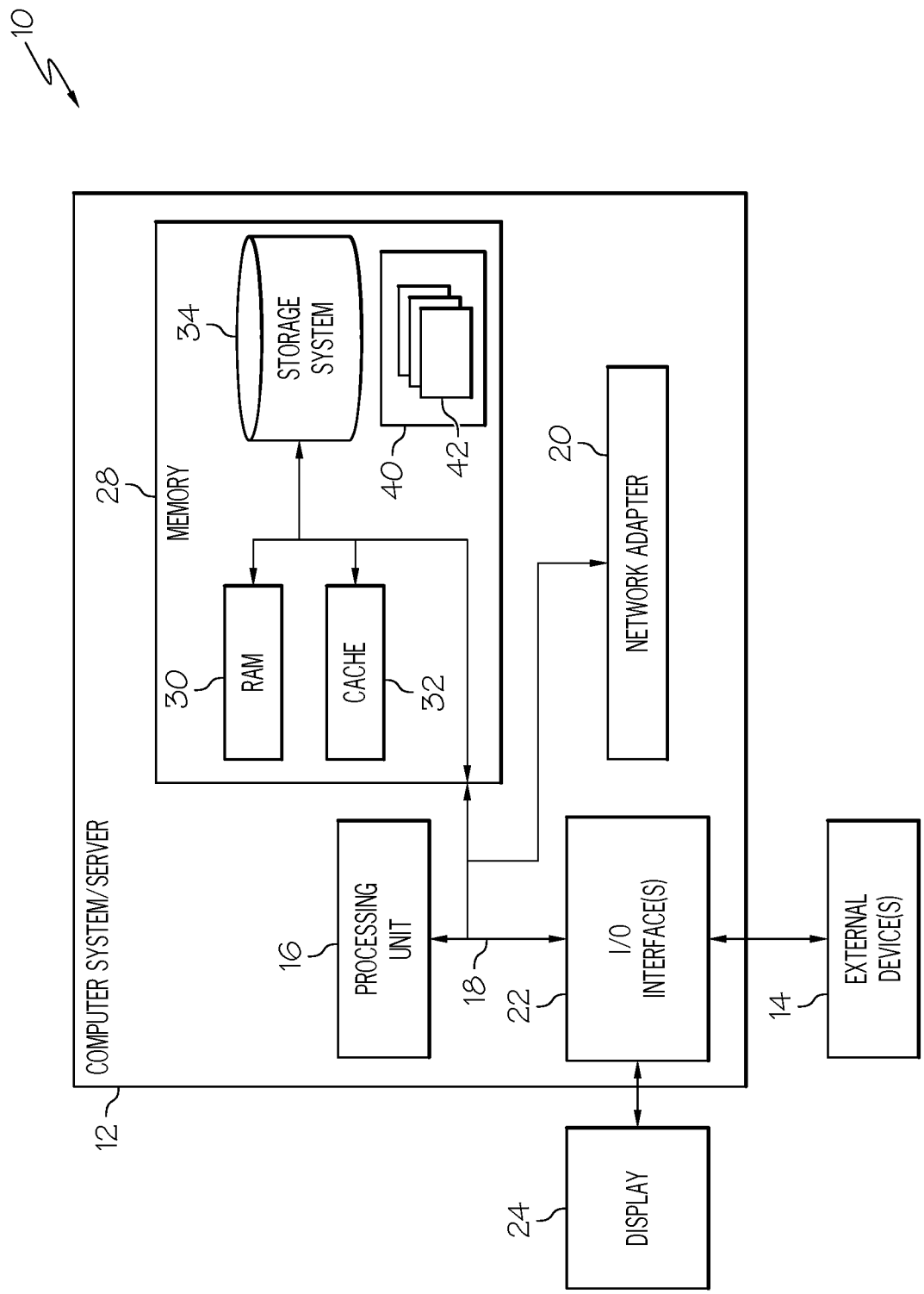
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for performing network intrusion detection and prevention service (NIDPS) detection on a proxy server in a networked computing environment. In an embodiment, the proxy server has a front end proxy, a NIDPS component, and a back end proxy installed on it. The front end proxy decodes communications sent by external users to content servers over a network that are intercepted by the proxy server and forwards the communications to the NIDPS component. The NIDPS component performs NIDPS detection to detect whether communications comprise a network threat. Communications that have been verified as not comprising a network threat are forwarded to the back end proxy for routing to their destinations. Communications that have been verified as threats are forwarded to a cognitive engine, which initiates an automatic scaling of the NIDPS component in response to indications of network threats from the NIDPS component.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a computerized implementation 10 (e.g., a cloud computing node) is shown. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
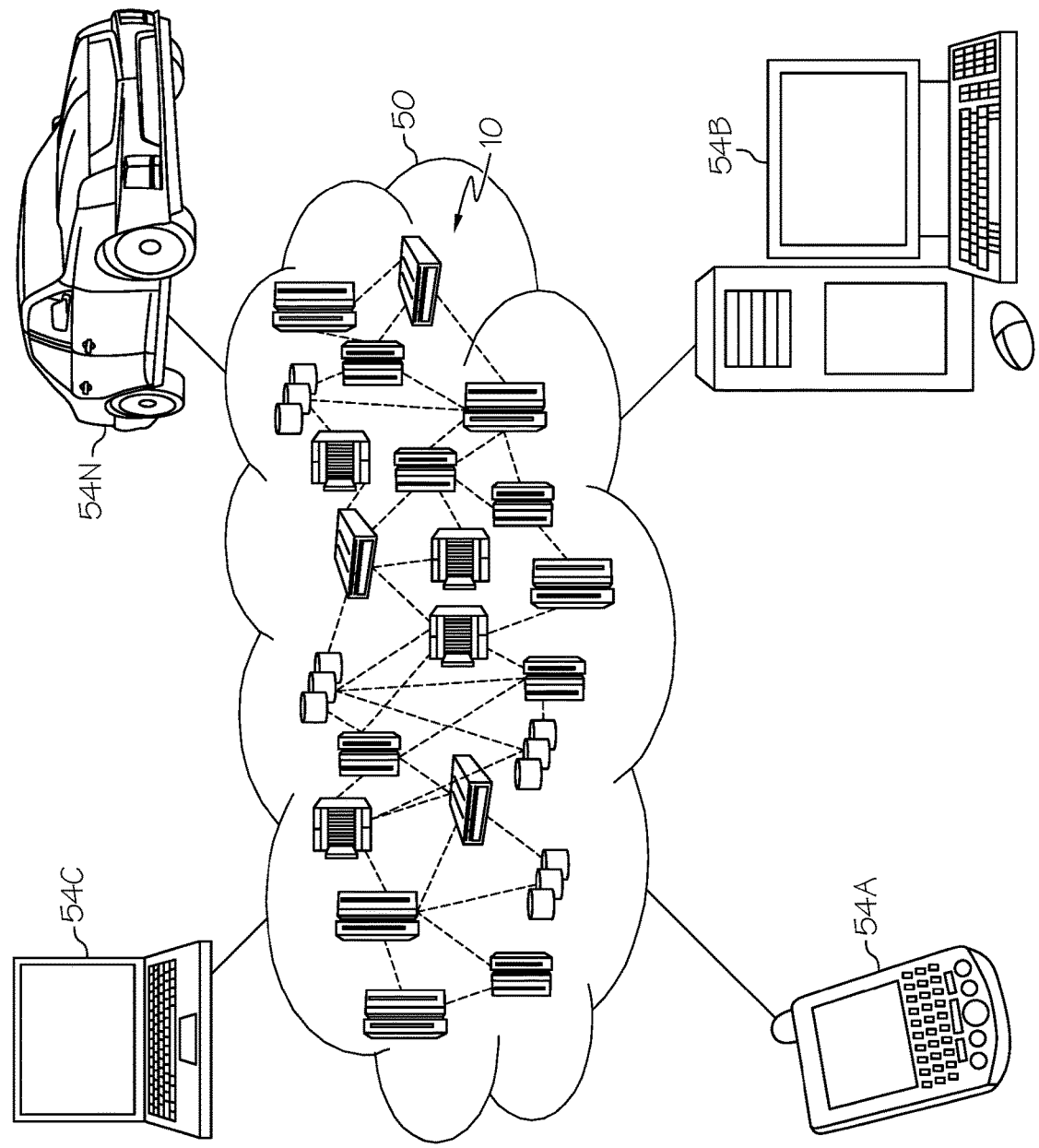
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes (e.g., utilizing computerized implementation 10) with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
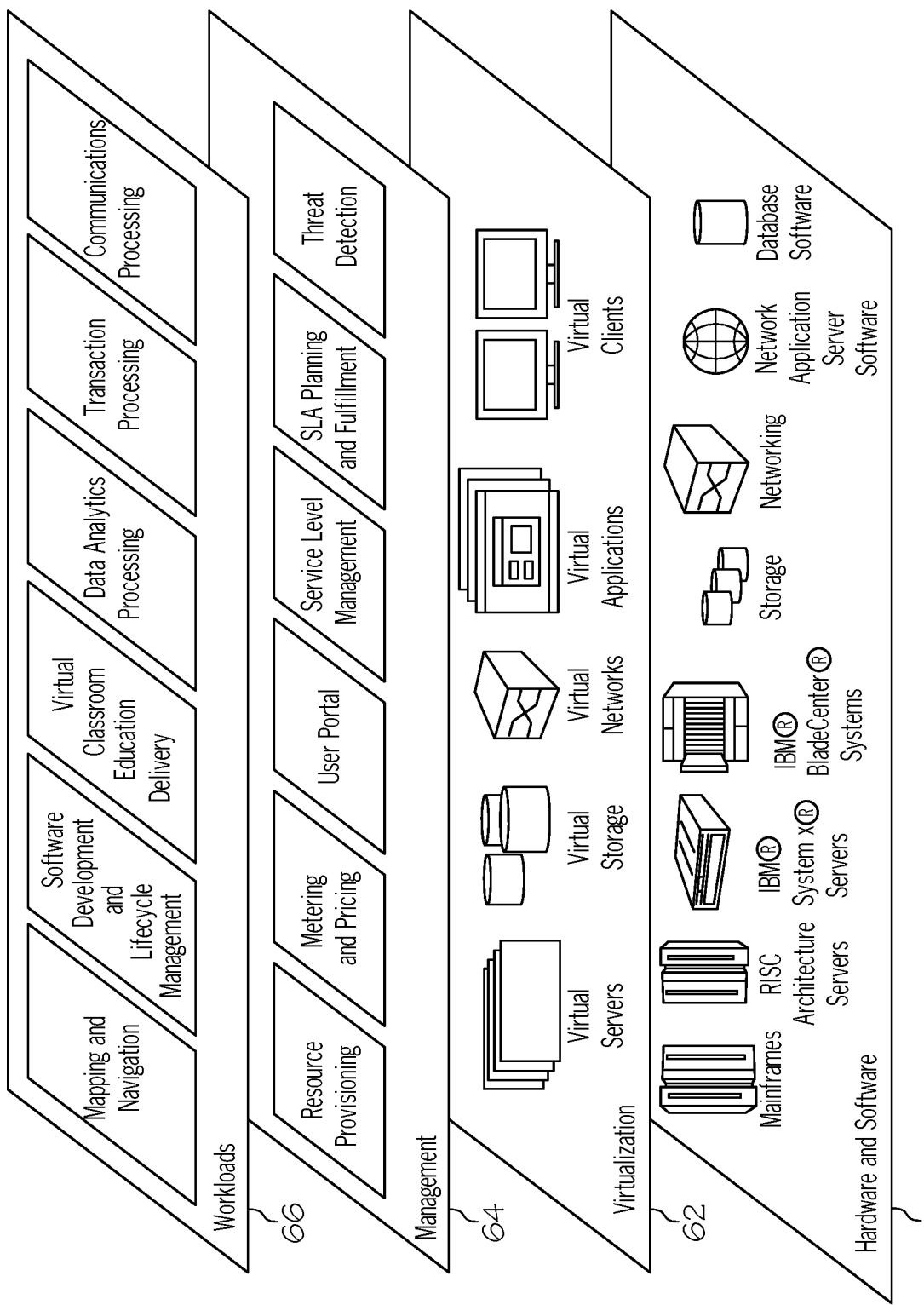
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer 64 is threat detection, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and communications processing. As mentioned above, all of the foregoing examples described with respect to FIG. 3 are illustrative only, and the invention is not limited to these examples.

It is understood that all functions of the present invention as described herein typically may be performed by the communication facilitation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
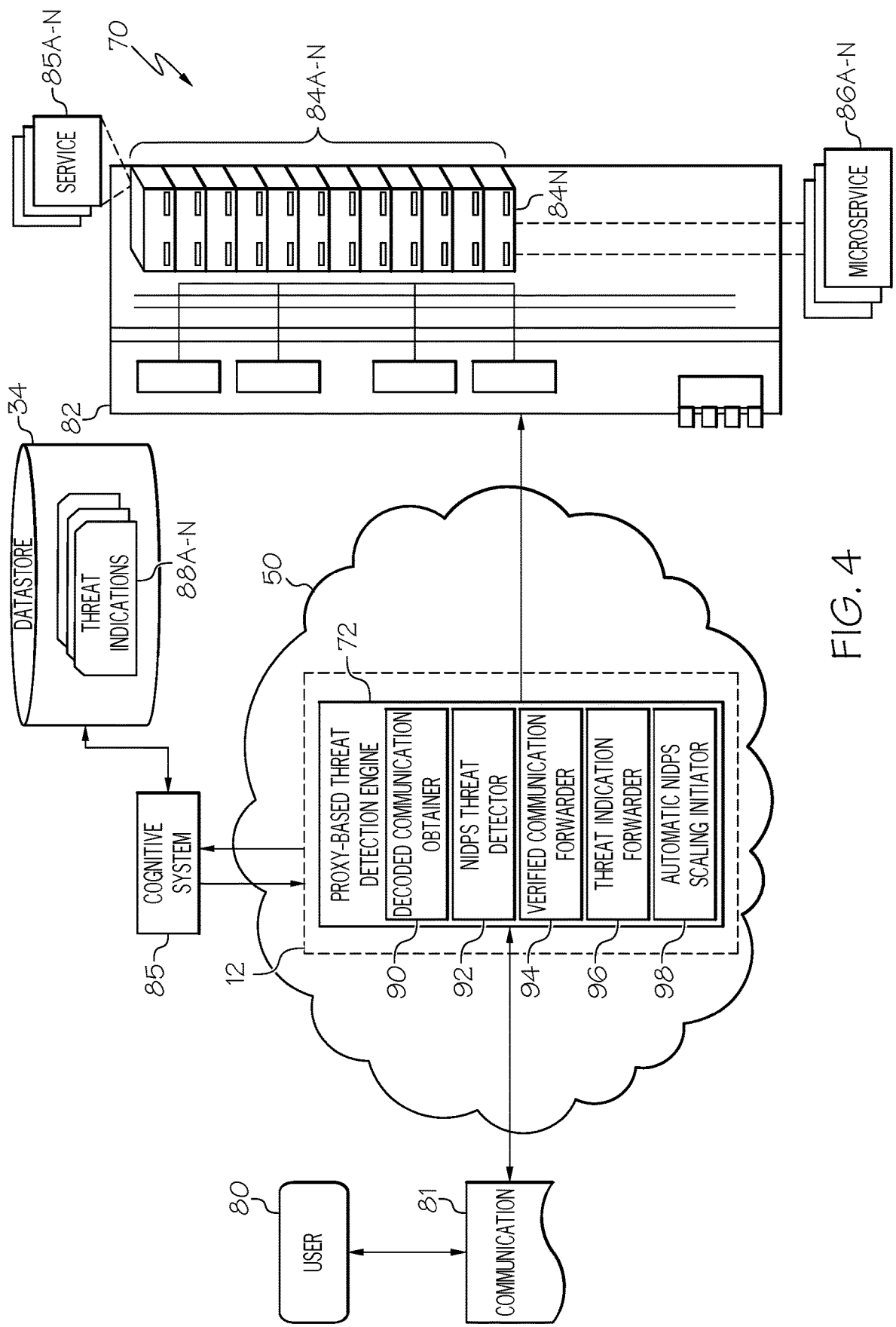
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment). A stand-alone computer system/server 12 is shown in FIG. 4 for illustrative purposes only. In the event the teachings recited herein are practiced in a networked computing environment 70, each proxy server need not have a proxy-based threat detection engine (hereinafter "system 72"). Rather, system 72 could be loaded on a server or server-capable device that communicates (e.g., wirelessly) with the proxy server to provide NIDPS detection of threats in communications 81 from a user 80 to one or more physical servers 82 in networked computing environment 70. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can provide NIDPS capabilities for one or more microservices 86A-N (e.g., executing in a computing node 84N of a plurality of computing nodes 84A-N) on physical server 82 in a networked computing environment 70. To accomplish this, system 72 can include: a decoded communications obtainer 90, a NIDPS threat detector 92, a verified communication forwarder 94, a threat indication forwarder 96, and an automatic NDIPS scaling initiator 98.

As shown, physical server 82 can host and/or provide one or more services 85A-N (generically 85N) and/or microservices 86A-N (generically 86N), which can be hosted and/or provided for within a number of computing nodes 84A-N. Computing nodes 84A-N can be or include a traditional virtual machine (VM) instance. Such a VM instance can be included in a computing node 84N as a virtual server on physical server 82. It should be understood that a VM instance is different from a process virtual machine. A process virtual machine is a platform dependent engine, such as a Java® Virtual Machine, that executes platform independent code written in a high-level programming language, such as Java, for performing a specific task (Java and Java Virtual Machine are trademarks of Oracle and/or its affiliates in the United States and/or elsewhere). In contrast, a VM instance is a virtual system that simulates an entire computing environment. To this extent, rather than performing only a single task, a VM instance is an environment, can include an operating system, middleware, one or more applications, and/or the like, within which a variety of tasks, functions, operations, etc., can be carried out by a user, such as by executing one or more applications thereon. As such, a VM instance can be made to simulate a stand-alone computer system in the eyes of a user. In any case, one or more of computing nodes 84A-N on physical service 82 can be configured as a microservice environment which can run one of more microservices 86A-N.

Figure 5:
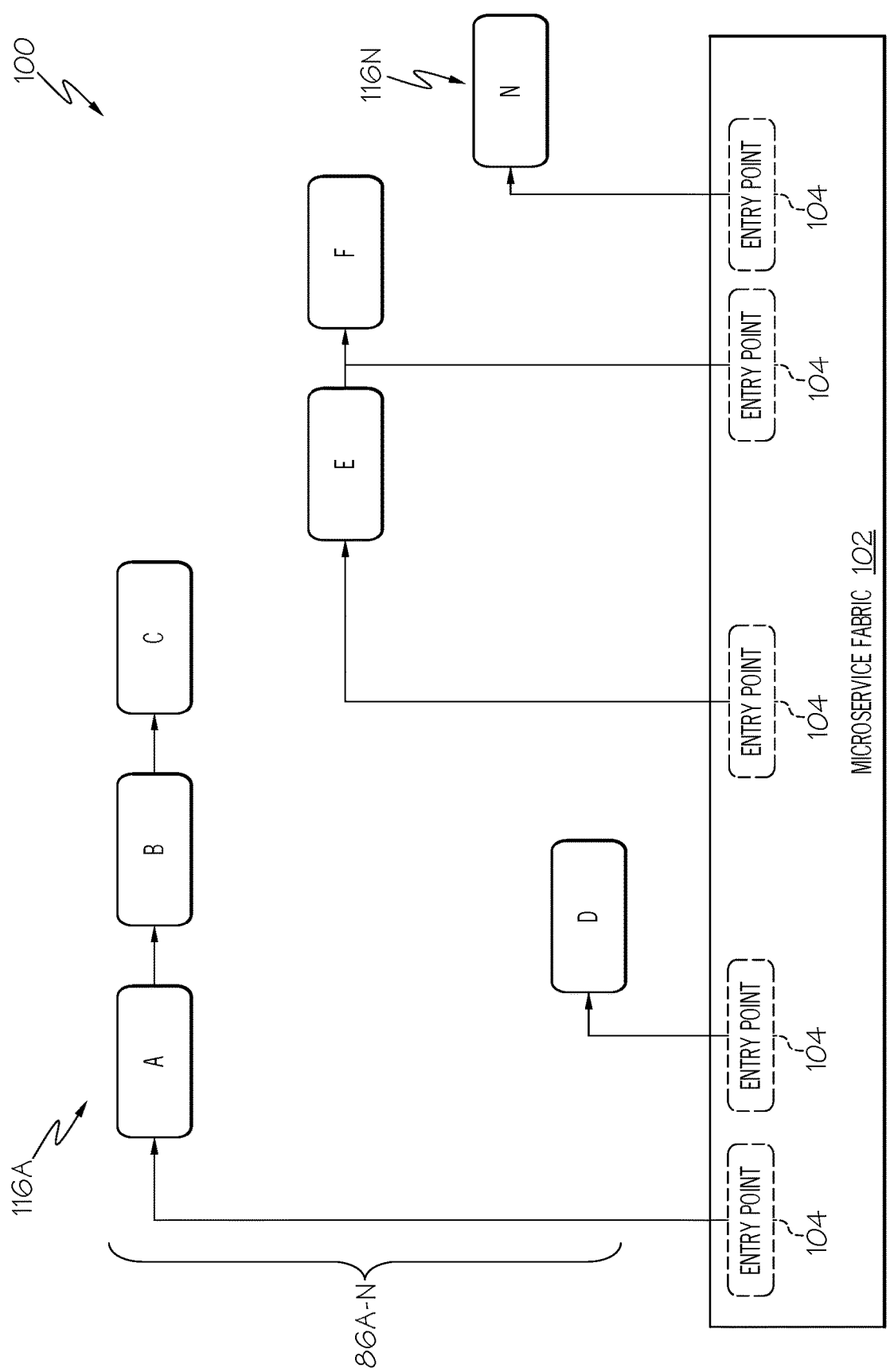
FIG. 5 depicts an example microservice environment according to an embodiment of the present invention.

Referring now to FIG. 5, an example microservice environment 100 is shown according to an embodiment of the invention. As shown, microservice environment 100 (e.g., within computing node 84N of FIG. 4) has the ability to run one or more microservices 86A-N. In addition, microservice environment 100 has the ability to run one or more microservice chains 116A-N (generically 116N), which can have one or more microservices 86A-N arranged together (e.g., in sequence) so that the functionalities thereof can operate in tandem. Further, microservice environment 100 can include a microservice fabric 102. In an embodiment, microservice fabric 102 can be an Amalgam8 microservice fabric. In any case, as stated above, each microservice 86N contains only the programmatic and data elements necessary for the microservice 86N to perform its function. To this extent, microservice fabric 102 provides generic functions (e.g., interface, inter-service communications, external communications, etc.) that would normally be performed by a monolithic service. Further, microservice fabric 102 can provide a user interface that allows a user 80 to be able to create and/or host a particular microservice 86N and/or to connect a number of microservices 86A-N into a microservice chain 116N. Further, microservice fabric 102 can manage communications into a microservice 86N and/or between microservices 86A-N. To accomplish this, microservice fabric 102 can include entry points 104 to one or more microservices 86A-N and/or microservice chains 116A-N.

The inventors of the invention described herein have discovered certain deficiencies in the current solutions for performing NIDPS detection for detecting network threats in communications 81 directed to a service 85N or a microservice 86N. In current solutions for providing threat detection, a detection solution, such as NIDPS, is run on the content server. However, these solutions have several drawbacks. For example, executing threat detection on the content server requires the content server to use resources (CPU, memory etc.) for prevention mechanisms such as NIDPS that could otherwise be used to host services 85A-N or microservices 86A-N. Moreover, all communications 81, including those that have threats, reach the content server. However, it would be preferable if threats were detected prior to reaching the content server. One way to accomplish this would be to run the threat detection on the proxy server, but this also has drawbacks. The primary responsibility of a proxy service in network computing environment 70 is to act as a proxy and to manage routes to the upstream cloud services, and adding threat detection to this responsibility can add time to the processing of communications 81, particularly when the number of threats increases. Scaling the NIDPS capability to account for all potential threats can require NIDPS scaling requirements that are greater that the main proxy component itself.

Certain embodiments of the present invention may offer various technical computing advantages, including the ability to provide proxy server-based NIDPS capabilities to a content server 82, which may not have been possible under previous solutions. The components used to provide the NIDPS capabilities are external to the content server 82 itself, allowing freeing up more resources for running services 85A-N and/or microservice 86A-N on content server 82 and ensuring that network threats are identified before they reach the content server. Moreover, the separation of the decoding and routing functions of the proxy server allows NIDPS detection to occur after a communication has been decoded, but before the communication has been routed to the content server 72, eliminating the resources wasted by performing routing of communications that content threats. Still further, the ability of the components used to provide the NIDPS capabilities on the proxy server to dynamically scale in response to threats and/or predicted threats minimizes the disruptions to throughput that would otherwise be caused by the NIDPS detection of a large number of threats, while using only the resources that are needed for NIDPS detection at the time that they are needed.

To this extent, referring again to FIG. 4, decoded communication obtainer 90 of system 72, as executed by computer system/server 12, is configured to obtain a set of decoded communications 81 from a front end proxy forwarded to an NIDPS component, each of which are located on a proxy server. Each of the set of decoded communications 81 is a communication 81 from user 80 to content server 82 (e.g., to utilize a service 85N or microservice 86N hosted on content server 82) that has been intercepted by the proxy server.

Figure 6:
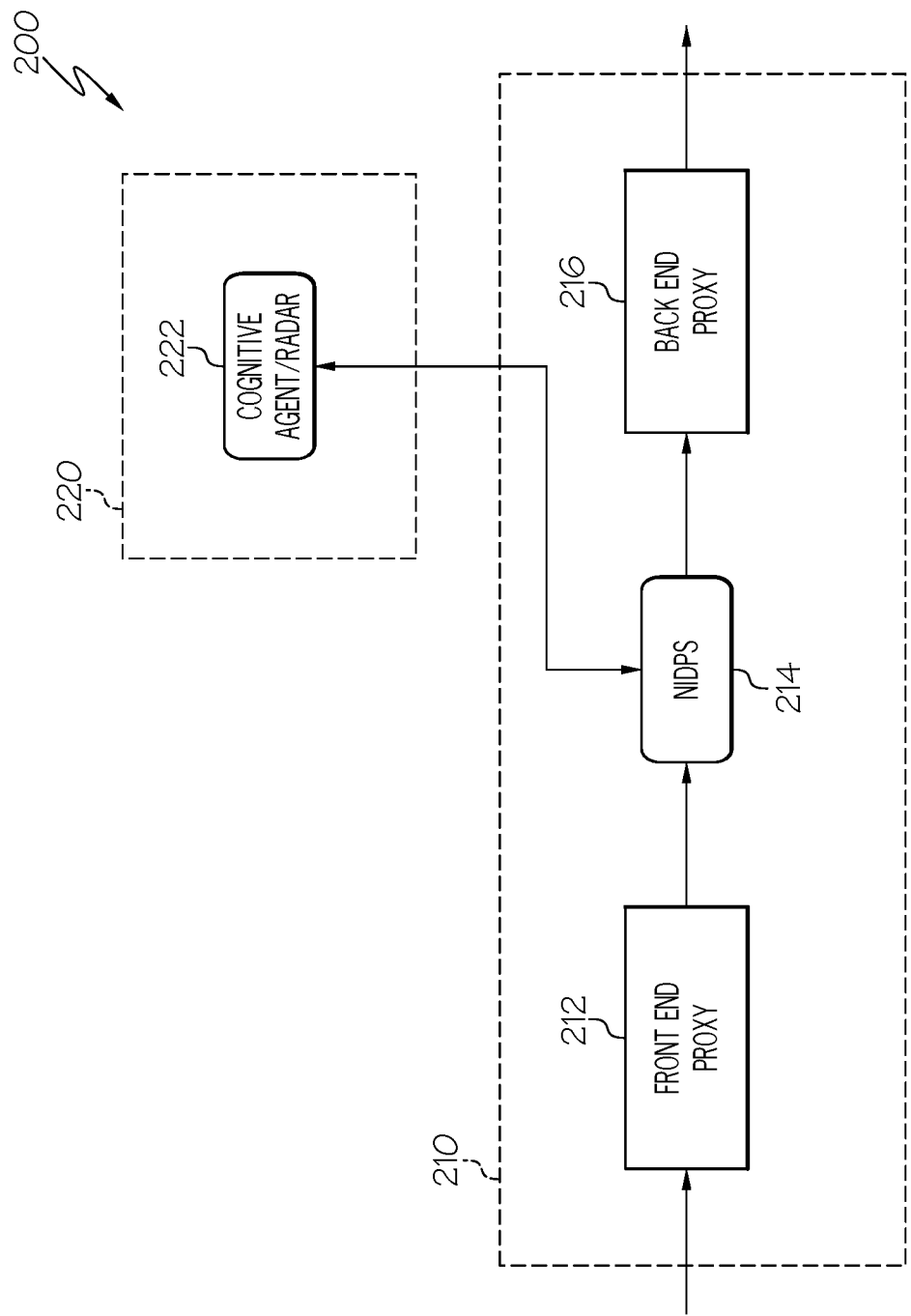
FIG. 6 depicts an example proxy server environment according to an embodiment of the present invention.

Referring now to FIG. 6, an example proxy server environment 200 is depicted according to an embodiment of the present invention. Proxy server environment 200 includes a proxy server 210 and a cognitive agent/radar 222 (e.g., in a cognitive server 220). As shown, the traditional decoding and routing functions of a traditional proxy server have been separated in proxy server 210, with the decoding function being performed by front end proxy 212 and the routing function being performed by back end proxy 216. Moreover, threat detection is performed on NDIPS 214, which is logically located between front end proxy 214 and back end proxy 216.

To this extent, referring additionally to FIG. 4, when communication 81 from user 80 to content server 82 (e.g., to utilize service 85N or microservice 86N) is intercepted by proxy server 210, communication 81 is first processed by front end proxy 212. Front end proxy 212 decodes communication 80, resulting in a decoded communication. To accomplish this, front end proxy 212 can determine whether the received communication 81 is being sent in a secure sockets layer (SSL). If it is determined that communication 81 is a SSL communication, front end proxy 212 can terminate the SSL for communication 81. To this extent, front end proxy 212 is configured to have all the necessary keys to handle SSL termination. In any case, front end proxy 212 can then parse header information and/or perform any other tasks necessary to decode the communication 80 before forwarding the decoded communication to NIDPS 214. Front end proxy 212 is, at any time, aware of the address of NIDPS 214 and forwards all the qualified (SSL terminated if on SSL) communications 80 to NIDPS queue 214.

In any case, referring again to FIG. 4 in conjunction with FIG. 6, NIDPS threat detector 92 of system 72, as executed on computer system/server 12, is configured to perform a verification of the decoded communication to detect whether the communication comprises a network threat. Specifically, once communication 81 has been decoded and forwarded to NIDPS 214 by front end proxy 212, NIDPS 214 can perform threat detection on communication 81 using any solution now known or later discovered. To this extent, NIDPS 214 is deployed as an independent service/component which listens on a queue of packets. For example, in an embodiment, the NIDPS 214 can be a microservice 86N that runs on a microservice fabric on proxy server 210. Alternatively, NIDPS 214 can be a non-microservice application that runs directly on proxy server 210. In an embodiment, NIDPS 214 is a stand-alone component, and not integrated with either front end proxy 212 or back end proxy 216, both of which may also be separate components, such that each of the three operates independently of each other. In any case, NIDPS 214 can analyze incoming traffic using rules to allow only safe/secure traffic to reach content server 82 that it protects. To accomplish this, each communication 81 of set of communications can be deposited into an input queue that allows NIDPS 214 to analyze the packets included in communications 81 based on its current capacity). NIDPS 214 analyzes the packets based on a set of rules (e.g., using a service such as Snort, Suricata, and/or the like). Based on the analysis, NIDPS 214 may reject the communication 81 or it may verify that the communication is a verified communication, containing no threat. Only verified communications 81 will be forwarded onward by NIDPS 214.

Referring again to FIG. 4 in conjunction with FIG. 6, verified communication forwarder 94 of system 72, as executed by computer system/server 12, is configured to forward each verified communication to back end proxy 216. Specifically, once NIDPS 214 has analyzed communication 81, it routes back packets that are safe (e.g., have been verified as not comprising a network threat) to route communication 81 to back end proxy 216 (e.g., via an output queue 240). Back end proxy 216 can then route communication 81 to content server 82, which is being protected from the intrusion. In an embodiment, back end proxy 216 accomplishes this by generating routing information between user 80 and content server 82 for verified communication 81, enabling user 80 to utilize service 85N and/or microservice 86N located thereon.

Referring again to FIG. 4 in conjunction with FIG. 6, threat indication forwarder 96 of system 72, as executed by computer system/server 12, is configured to forward any indications of network threats to cognitive agent/radar 222. To accomplish this, NIDPS 214, in response to the detection of a communication 81 that contains a network threat, can additionally forward an indication of the threat to cognitive agent/radar 222. This indication can include the communication 81, itself, as well as characteristics that are associated with the network threat. These associated characteristics can include such information as the size of communication 81, the originating location of communication 81, the date/time (e.g., month, time of month, day of the week, time of day, etc.) that originating communication was sent. Further, in an embodiment, associated information regarding communications 81 that have been verified by NIDPS 214 can be forwarded to cognitive server 220 along with the threat indications. These threat indications 88A-N, with or without the information about the verified communications, can be stored (e.g., in datastore 34) by cognitive server 220, NIDPS 214, and/or the like, to be used by cognitive server 220 in the future.

Automatic NIDPS scaling initiator 98 of system 72, as executed by computer system/server 12, is configured to initiate an automatic scaling of NIDPS 214. In particular, cognitive server 220 can identify a threat indication 88A-N within the information forwarded to cognitive server 220 by NIDPS 214. This threat indication 88N can be included within a communication 81 that has been identified by NIDPS 214 as being a threat or, alternatively, within a verified communication. For example, suppose that NIDPS 214 forwards information regarding a communication 81 that includes one or more associated characteristics that have been previously identified with a network threat. Cognitive server 220 (e.g., cognitive agent/radar 222) can identify this associated characteristic of network threat within communication 81 sent by NIDPS 214. Based on this identification, a number of new NIDPS queues, one or more of which can be based on the associated characteristic, can be created in NIDPS 214. Thus, overall user experience is improved even during a heavy intrusion situation by proactively predicting NIDPS 214 scaling requirements with the help of cognitive agent/radar 222.

Figure 7:
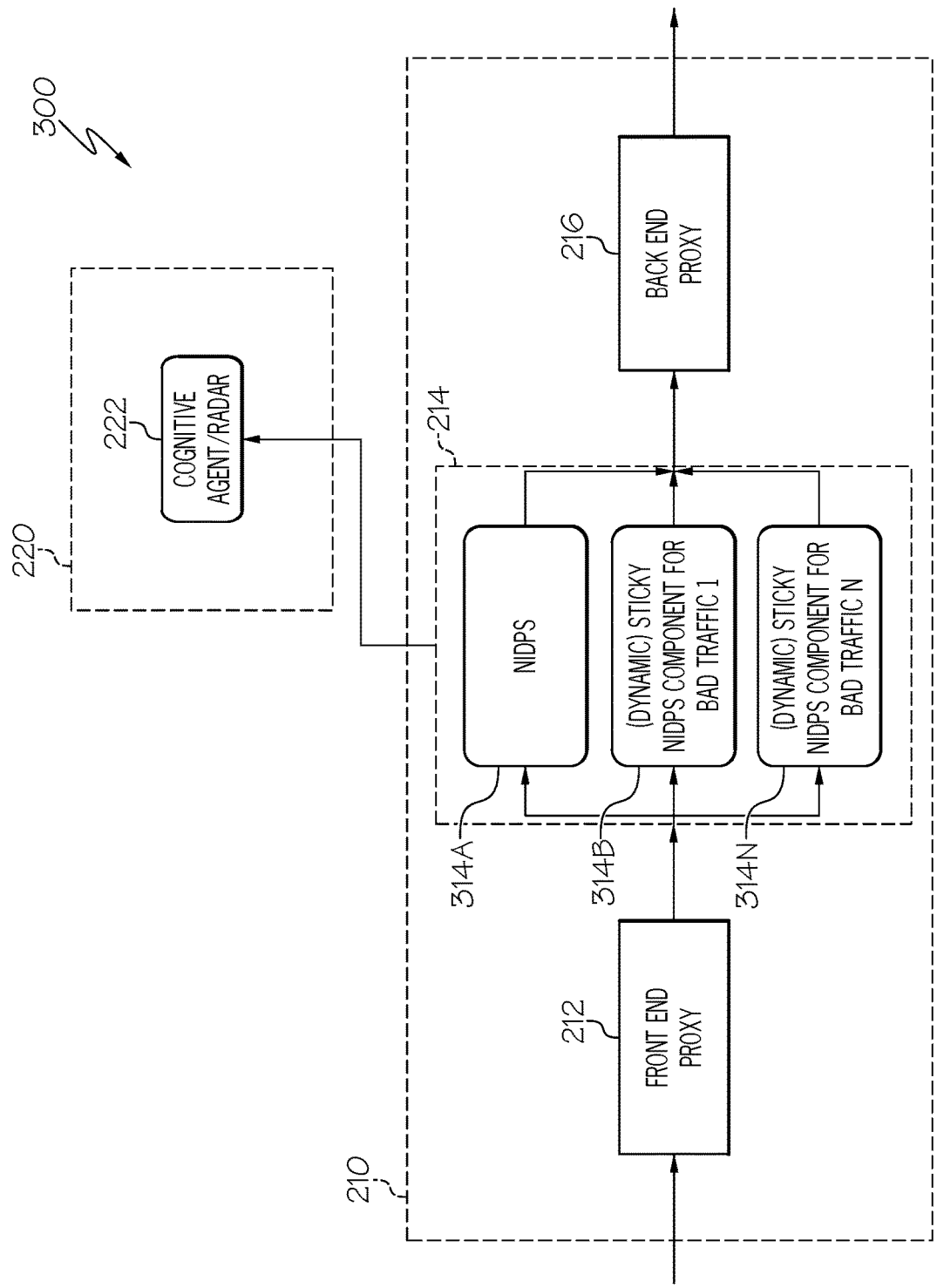
FIG. 7 depicts an example proxy server environment that has been automatically scaled according to an embodiment of the present invention.

Referring now to FIG. 7 in conjunction with FIG. 4, an example scaled proxy server environment 300 that has been automatically scaled is depicted according to an embodiment of the present invention. As shown, NDIPS 214 has been scaled to include a number of new NIDPS queues 314B-N. As a result, NDIPS 214 now has not only the original NIDPS queue 314A, but also a number of new NDIPS queues 314B-N. One or more of new NIDPS queues 314B-N can be a generic queue that processes any incoming communication 81, regardless of the associated characteristics. For example, if cognitive server 220 determines that the associated characteristic includes a time of day that has previously been subject to network threats, additional new NIDPS queues 314B-N can be created and incoming communications can be distributed among the NIDPS queues 314A-N until cognitive server 220 determines that the threat has passed.

Additionally, or in the alternative, one or more of new NIDPS queues 314B-N can be dedicated to incoming communications 81 having a particular associated characteristic. For example, if the associated characteristic includes the source of the communication, one or more of new NIDPS queues 314B-N can be a source-based dedicated queue that is dedicated to communications 81 originating from the identified source. In such a case, NIDPS component 214 could pass "source of threat" and "NIDPS dedicated queue" details to front end proxy 212. Based on this, front end proxy 212 can configure a new sticky rule in such a way that all the traffic from the "source of threat" will be routed to "NIDPS dedicated queue". There can as many dedicated queues 314B-N as the hardware in a particular ecosystem can support. All of the dedicated NIDPS queues 314B-N send traffic that has been verified to back end proxy 216, just as the traffic originally sent by the original NIDPS component 314A.

In an embodiment, different dedicated NIDPS instances 314B-N can be scaled differently based on the threat rate from each source of threat, combined optionally with the predications offered by cognitive agent/radar 222. For example: Threat rate from source1 may be much higher than threat rate from source 2; hence NIDPS cluster 314N dedicated to source 1 may need to be scaled higher than the NIDPS cluster dedicated to source 2. In any case, this allocation of new NIDPS queues 314B-N to sources of known threats allows bad traffic that can be channeled to specialized (in terms or resource and security measures) NIPDS queues 314B-N, preserving the throughput for other users 80. Whatever the case, once cognitive server 220 determines that the threat has passed (e.g., the threat rate has come to normal and stays normal for a configured period of time), one or more of the new NIDPS queues 314B-N can be removed to free up resources on proxy server 214.

Figure 8:
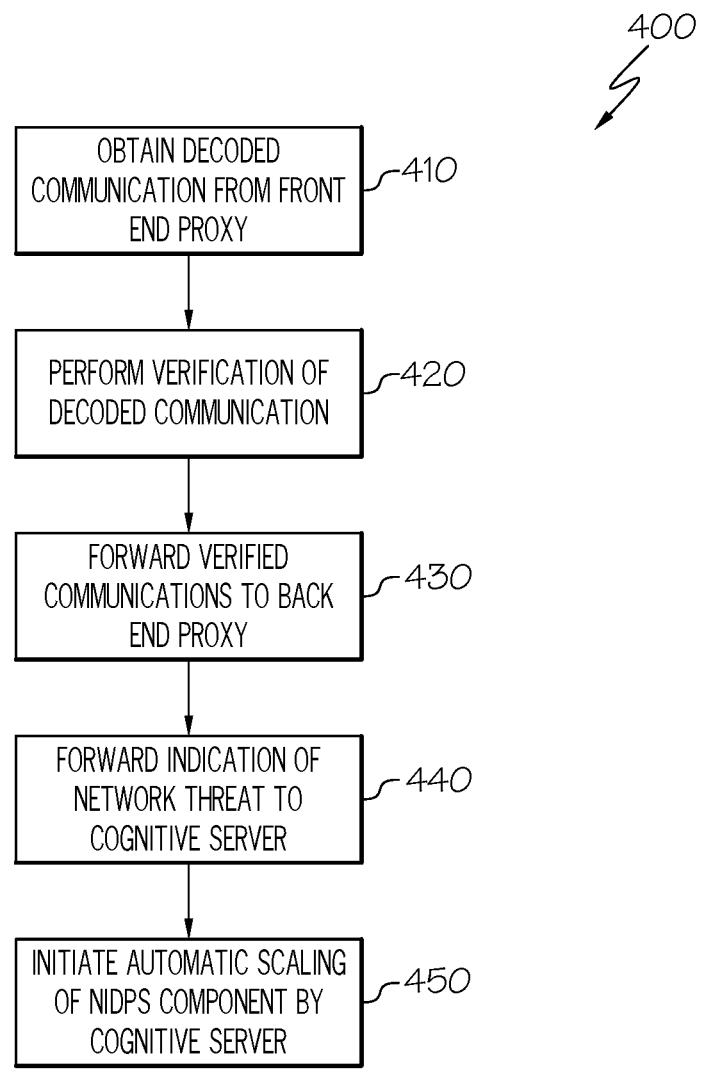
FIG. 8 an example process flowchart according to an embodiment of the present invention.

Referring now to FIG. 8 in conjunction with FIGS. 4 and 6, a process flowchart 400 according to an embodiment of the present invention is shown. At 410, decoded communication obtainer 90 of system 72, as executed by computer system/server 12, obtains a set of decoded communications 81 from a front end proxy 212 located on proxy server 210. These decoded communications 81 are communications 81 sent by external users 80 to content servers 82 over network 50 that are intercepted by proxy server 210 and decoded by front end proxy 212. At 420, NIDPS threat detector 92, as executed by computer system/server 12, performs a verification of decoded communications 81 to detect whether communication 81 comprises a network threat. At 430, verified communication forwarder 94, as executed by computer system/server 12, forwards communications that have been verified as not comprising network threats to back end proxy 216. At 440, threat indication forwarder 96, as executed by computer system/server 12, forwards any indication of network threats to cognitive server 220. At 450, cognitive server 220 automatically scales NIDPS component 210 in response to indications of network threats from NIDPS component 210.

The process flowchart of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for performing network intrusion detection and prevention service (NIDPS) detection on a proxy server in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for providing NIDPS capabilities. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for providing NIDPS capabilities to a microservice in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for performing network intrusion detection and prevention service (NIDPS) detection on a proxy server in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for performing network intrusion detection and prevention service (NIDPS) detection on a proxy server in a networked computing environment, comprising:
    obtaining, by a NIDPS component located on a proxy server, a set of decoded communications from a front end proxy located on the proxy server, the decoded communications being communications sent by external users to content servers over a network that are intercepted by the proxy server and decoded by the front end proxy;
    performing, by an NIDPS component, a verification of the decoded communications to detect whether the communication comprises a network threat;
    forwarding, by the NIDPS component in response to the verification that the decoded communication does not comprise a network threat, a verified communication to a back end proxy;
    forwarding, in response to a detection of a network threat by the NIDPS component, an indication of the network threat to a cognitive server; and
    initiating an automatic scaling of the NIDPS component by the cognitive server that is based on an associated characteristic of the network threat in response to indications of network threats from the NIDPS component, the initiating of the automatic scaling further comprising:
        identifying, by the cognitive server, the associated characteristic of the network threat within the communication sent by the NIDPS component;
        creating a number of new NIDPS queues in the NIDPS component based on the associated characteristic; and
        distributing communications among the new NIDPS queues.

2. The method of claim 1, further comprising generating, by the back end proxy, routing information between the external users and the content servers for the verified communication.

3. The method of claim 1, further comprising:
    receiving, at the front end proxy, a communication of the set of communications;
    determining whether the communication is a secure sockets layer (SSL) communication;
    terminating, in response to a determination that the communication is a SSL communication, the SSL for the communication; and
    decoding the communication for forwarding to the NIDPS component.

4. The method of claim 1, wherein the associated characteristic includes a time of day that has previously been subject to network threats.

5. The method of claim 1, wherein, in response to the associated characteristic including a source of the communication, at least one of the new queues is a source-based dedicated queue that is dedicated to the source of the communication.

6. The method of claim 1,
    wherein the networked computing environment is a cloud computing environment, and
    wherein the proxy server is a cloud server in the cloud computing environment.

7. A computer system for performing network intrusion detection and prevention service (NIDPS) detection on a proxy server in a networked computing environment, the computer system comprising:
    a proxy server located between a content server and a network and having:
        a front end proxy that decodes a set of communications from external users over the network into decoded communications;
        a back end proxy operating independently from the front end proxy that generates routing information between the content servers and the external users for verified communications;
        a NIDPS component operating independently from the front end proxy and the back end proxy that verifies that the decoded communications are free from network threats and forwards the verified communications to the back end proxy; and
        a cognitive server that initiates automatic scaling of the NIDPS component that is based on an associated characteristic of the network threat in response to indications of network threats from the NIDPS component, the cognitive server further:
            identifying the associated characteristic of the network threat within the communication sent by the NIDPS component;

creating a number of new NIDPS queues in the NIDPS component based on the associated characteristic; and distributing communications among the new NIDPS queues.

8. The system of claim 7, the front end proxy further:

receiving a communication of the set of communications;

determining whether the communication is a secure sockets layer (SSL) communication;

terminating, in response to a determination that the communication is a SSL communication, the SSL for the communication; and decoding the communication for forwarding to the NIDPS component.

9. The system of claim 7, wherein the associated characteristic includes a time of day that has previously been subject to network threats.

10. The system of claim 7, wherein, in response to the associated characteristic including a source of the communication, at least one of the new queues is a source-based dedicated queue that is dedicated to the source of the communication.

11. The system of claim 7, wherein the networked computing environment is a cloud computing environment, and wherein the proxy server is a cloud server in the cloud computing environment.

12. A computer program product embodied in a computer readable storage medium that, when executed by a computer device, performs a method for performing network intrusion detection and prevention service (NIDPS) detection on a proxy server in a networked computing environment, the method comprising:

obtaining, by a NIDPS component located on a proxy server, a set of decoded communications from a front end proxy located on the proxy server, the decoded communications being communications sent by external users to content servers over a network that are intercepted by the proxy server and decoded by the front end proxy;

performing, by an NIDPS component, a verification of the decoded communications to detect whether the communication comprises a network threat;

forwarding, by the NIDPS component in response to the verification that the decoded communication does not comprise a network threat, a verified communication to a back end proxy;

forwarding, in response to a detection of a network threat by the NIDPS component, an indication of the network threat to a cognitive server; and initiating an automatic scaling of the NIDPS component by the cognitive server that is based on an associated characteristic of the network threat in response to indications of network threats from the NIDPS component, the initiating of the automatic scaling further comprising:

identifying, by the cognitive server, the associated characteristic of the network threat within the communication sent by the NIDPS component;

creating a number of new NIDPS queues in the NIDPS component based on the associated characteristic; and distributing communications among the new NIDPS queues.

13. The program product of claim 12, the method further comprising generating, by the back end proxy, routing information between the external users and the content servers for the verified communication.

14. The program product of claim 12, the method further comprising:

receiving, at the front end proxy, a communication of the set of communications;

determining whether the communication is a secure sockets layer (SSL) communication;

terminating, in response to a determination that the communication is a SSL communication, the SSL for the communication; and decoding the communication for forwarding to the NIDPS component.

15. The program product of claim 12, wherein the associated characteristic includes a time of day that has previously been subject to network threats.

16. The program product of claim 12, wherein, in response to the associated characteristic including a source of the communication, at least one of the new queues is a source-based dedicated queue that is dedicated to the source of the communication.

17. The method of claim 12, wherein the networked computing environment is a cloud computing environment, and wherein the proxy server is a cloud server in the cloud computing environment.

* * * * *